(12) United States Patent
Riordon et al.

(10) Patent No.: US 11,698,506 B2
(45) Date of Patent: Jul. 11, 2023

(54) CARRIER MECHANISM FOR CLEANING AND HANDLING

(71) Applicant: Applied Materials, Inc., Santa Clara, CA (US)

(72) Inventors: Benjamin B. Riordon, Newburyport, MA (US); Kangkang Wang, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 38 days.

(21) Appl. No.: 17/307,154

(22) Filed: May 4, 2021

(65) Prior Publication Data

US 2022/0163792 A1    May 26, 2022

Related U.S. Application Data (60) Provisional application No. 63/153,855, filed on Feb. 25, 2021, provisional application No. 63/117,573, filed on Nov. 24, 2020.

(51) Int. Cl.
*G02B 7/00* (2021.01)

(52) U.S. Cl.
CPC ...................................... *G02B 7/00* (2013.01)

(58) Field of Classification Search
CPC ........................................................ G02B 7/00
USPC .......................................... 359/811, 819, 821
See application file for complete search history.

(56) References Cited

U.S. PATENT DOCUMENTS 7,586,696 B2 *    9/2009    Wu ..................... B24B 13/0055
                                                                359/819

FOREIGN PATENT DOCUMENTS

| JP | 2001221902 A | 8/2001 |
|---|---|---|
| JP | 2007109763 A | 4/2007 |
| JP | 2014118631 A | 6/2014 |
| KR | 101954799 B1 | 3/2019 |
| WO | 2017059235 A1 | 4/2017 |

OTHER PUBLICATIONS

International Search Report/Written Opinion issued to PCT/US2021/058078 dated Feb. 18, 2022.

* cited by examiner

*Primary Examiner* — William Choi
(74) *Attorney, Agent, or Firm* — Patterson + Sheridan, LLP (57) ABSTRACT

Embodiments of the present disclosure relate to a carrier mechanism for retaining optical devices. The carrier mechanism includes adjacent tray assemblies stacked such that a plurality of optical device lenses are retained therebetween. The carrier mechanism retains the plurality of optical device lenses without damaging the plurality of optical device lenses by contacting corners of the optical device lenses. The plurality of optical device lenses are retained with a plurality of support pins and a plurality of capture pins disposed in the tray assemblies. Each tray includes a plurality of openings corresponding to the plurality of optical device lenses such that fluids may contact the plurality of optical device lenses. The carrier mechanism may be utilized in multiple processing methods of the plurality of optical device lenses.

20 Claims, 5 Drawing Sheets

CARRIER MECHANISM FOR CLEANING AND HANDLING

CROSS-REFERENCE TO RELATED APPLICATIONS

This application claims priority from U.S. Application Ser. No. 63/117,573, filed Nov. 24, 2020 and U.S. Application Ser. No. 63/153,855, filed Feb. 25, 2021, which are hereby incorporated by reference in their entirety.

BACKGROUND

Field

Embodiments of the present disclosure generally relate to optical devices. More specifically, embodiments described herein relate to a carrier mechanism for retaining optical devices.

Description of the Related Art

Optical devices including waveguide combiners, such as augmented reality waveguide combiners, and flat optical devices, such as metasurfaces, are used to assist in overlaying images. Generated light is propagated through an optical device until the light exits the optical device and is overlaid on the ambient environment.

The optical devices generally include structures disposed on the optical devices. The optical devices and structures formed thereon are formed from thin, brittle materials that are damaged when exposed to external stresses. Additionally, some coatings applied over the optical devices and structures formed thereon are sensitive to handling. Thus, optical devices are susceptible to damage when transferring the optical devices between different processing tools. Therefore, utilizing carrier mechanisms to retain the optical devices during a processing operation is desirable. However, carrier mechanisms require precise configurations to avoid contacting and damaging the structures, coatings, and optical devices.

Additionally, many carrier mechanisms for retaining the optical devices are generally only used for one step of a series of processing operations, leading to an increase in handling of the optical devices. For example, vertical processing and fluid based cleaning operations are difficult to perform while retaining the optical devices in carrier mechanisms. The increased handling may lead to damage to the optical devices. Accordingly, what is needed in the art is a carrier mechanism for retaining optical devices.

SUMMARY

In one embodiment, a carrier having at least two tray assemblies is provided. Each tray assembly includes a first locating rail and a first non-locating rail. Each tray assembly further includes a tray coupled to the first locating rail and the first non-locating rail. The tray is disposed between the first locating rail and the first non-locating rail. Each tray assembly further includes a plurality of openings disposed through the tray and a plurality of capture pins disposed through the tray. Each tray assembly further includes a plurality of support pins disposed through the tray, the plurality of support pins and the plurality of capture pins operable to retain a plurality of optical device lenses.

In another embodiment, a carrier having at least two tray assemblies is provided. Each tray assembly includes a first locating rail and a first non-locating rail. Each tray assembly further includes a tray coupled to the first locating rail and the first non-locating rail. The tray is disposed between the first locating rail and the first non-locating rail. Each tray assembly further includes a plurality of openings disposed through the tray and a plurality of capture pins disposed through the tray. Each tray assembly further includes a plurality of support pins disposed through the tray. The plurality of support pins and the plurality of capture pins are operable to retain a plurality of optical device lenses. The plurality of support pins include a ramp operable to contact a corner of the plurality of optical device lenses.

In yet another embodiment, a method is provided. The method includes positioning a carrier mechanism in a processing station including a fluid. The carrier mechanism is operable to retain a plurality of optical device lenses between a first tray assembly and a second tray assembly. The plurality of optical device lenses are retained by a plurality of support pins disposed in the first tray assembly and a plurality of capture pins disposed in the second tray assembly. The method further includes directing ultrasonic energy towards the carrier mechanism. The ultrasonic energy propagates parallel to a surface of the plurality of optical device lenses to be cleaned. The ultrasonic energy forces the fluid through a gap between the first tray assembly and the second tray assembly and through a plurality of openings in the first tray assembly and the second tray assembly.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to optical devices. More specifically, embodiments described herein relate to a carrier mechanism for retaining optical devices. In one embodiment, a carrier having at least two tray assemblies is provided. Each tray assembly includes a first locating rail and a first non-locating rail. Each tray assembly further includes a tray coupled to the first locating rail and the first non-locating rail. The tray is disposed between the first locating rail and the first non-locating rail. Each tray assembly further includes a plurality of openings disposed through the tray and a plurality of capture pins disposed through the tray. Each tray assembly further includes a plurality of support pins disposed through the tray, the plurality of support pins and the plurality of capture pins operable to retain a plurality of optical device lenses.

Figure 1A:
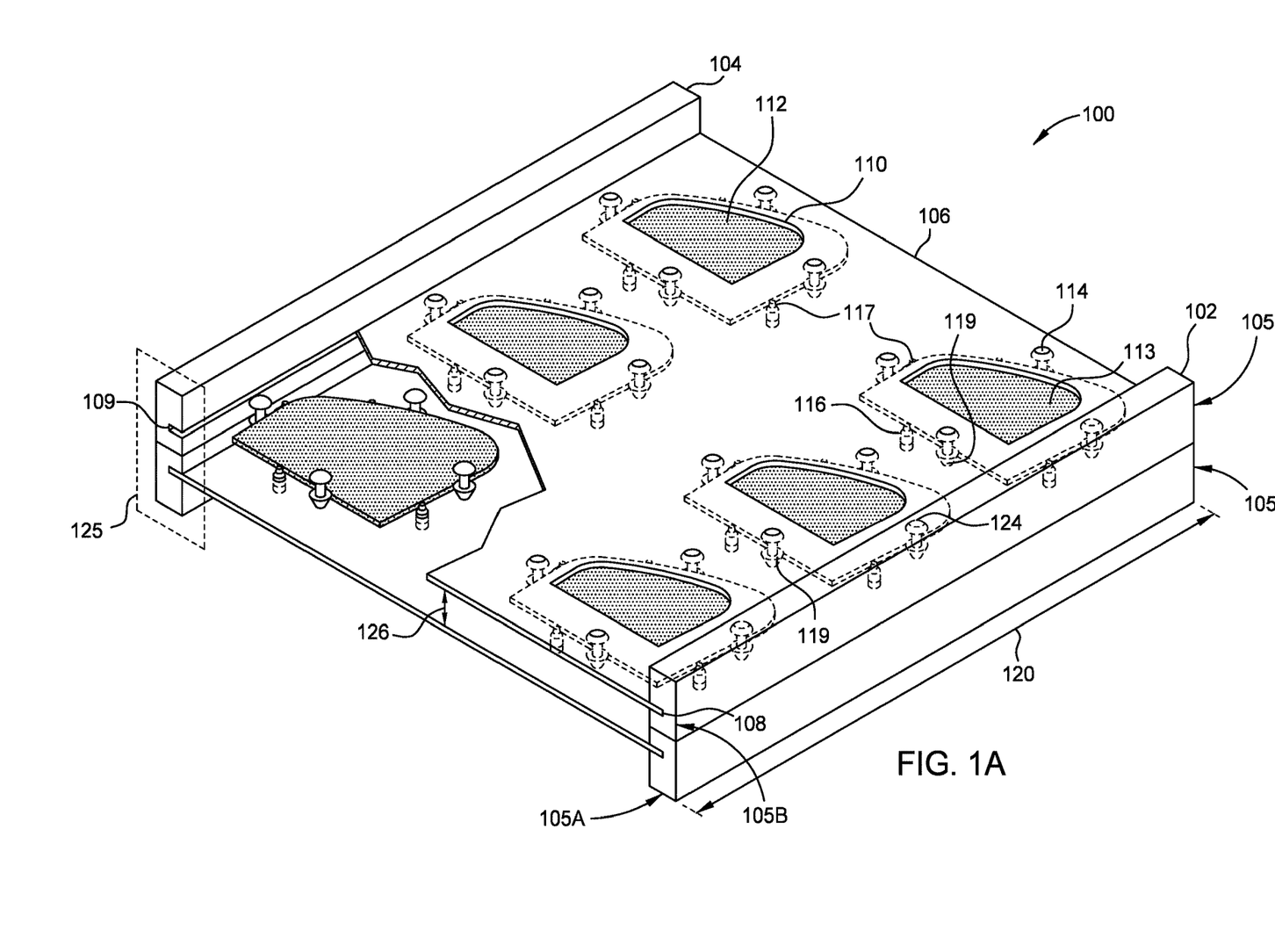
FIG. 1A is a schematic, perspective view of a carrier mechanism according to embodiments.

FIG. 1A is a schematic, perspective view of a carrier mechanism 100. The carrier mechanism 100 includes two or more tray assemblies 105 i.e., a first tray assembly 105A and a second tray assembly 105B. Each tray assembly 105 includes a locating rail 102, a non-locating rail 104, and a tray 106. The tray 106 may be coupled to a plurality of capture pins 114 and a plurality of support pins 116. In one embodiment, which can be combined with other embodiments described herein, the carrier mechanism 100 has a carrier mechanism height 120 of between about 135 mm to about 323 mm. The carrier mechanism 100 is operable to retain a plurality of optical device lenses 112. The carrier mechanism 100 provides for the plurality of optical device lenses 112 to be placed in a cleaning device, such as an ultrasonic cleaner. The carrier mechanism 100 allows for chemical exposure, thermal exposure, vibrations, and other fabrication steps to be applied to the plurality of optical device lenses 112. Additionally, the carrier mechanism 100 allows for metrology processes to be performed on the plurality of optical device lenses 112. For example, optical inspection or quality inspection may be performed on the plurality of optical device lenses 112 when retained by the carrier mechanism 100. The carrier mechanism 100 may also be utilized to retain the plurality of optical device lenses for shipping. Although only four capture pins 114 and four support pins 116 are shown retaining each optical device lens of the plurality of optical device lenses 112, any number of the plurality of support pins 116 and the plurality of capture pins 114 may be disposed in the tray 106 to retain the optical device lenses 112 as desired.

As shown in FIG. 1A, two or more tray assemblies 105 are stacked together to form the carrier mechanism 100. The carrier mechanism 100 includes at least the second tray assembly 105B disposed on, i.e., stacked on, the first tray assembly 105A. The locating rail 102 and non-locating rail 104 of the first tray assembly 105A are able to be in contact with the adjacent locating rail 102 and non-locating rail 104 of the second tray assembly 105B such that the two or more tray assemblies 105 may be stacked. The locating rail 102 and the non-locating rail 104 are formed such that the locating rail 102 and non-locating rail 104 of the first tray assembly 105A are able to be overlapped with the adjacent locating rail 102 and non-locating rail 104 of the second tray assembly 105B to remain stacked. In one embodiment, which can be combined with other embodiments described herein, locating pins are disposed on the locating rail 102 such that the two or more tray assemblies 105 remain overlapped and stacked. The two or more tray assemblies 105 may be stacked utilizing a tray feeder. Although only two tray assemblies 105 (the first tray assembly 105A and the second tray assemblies 105B) are shown in FIG. 1A, the carrier mechanism 100 may include more than two stacked tray assemblies 105. For example, the carrier mechanism 100 can include ten tray assemblies 105 in a stack.

The locating rail 102 and the non-locating rail 104 retain the tray 106. The locating rail 102 includes a first slit 108. The non-locating rail 104 includes a second slit 109. The first slit 108 and the second slit 109 allow for the tray 106 to be positioned between the locating rail 102 and the non-locating rail 104. The tray 106 is inserted into the first slit 108 of the locating rail 102. The first slit 108 aligns the tray 106 within the tray assembly 105. The tray 106 is then slid into the second slit 109 of the non-locating rail 104. The locating rail 102 and the non-locating rail 104 are formed from materials that include, but are not limited to, stainless steel, plastic (such as polypropylene), ceramic (such as $Al_2O_3$), brass, or combinations thereof.

The tray 106 further includes a plurality of openings 110. The plurality of openings 110 provide access to the plurality of optical device lenses 112 disposed between two stacked tray assemblies 105. The shape of the plurality of openings 110 may be adjusted to correspond to a contour of the plurality of optical device lenses 112 disposed between the two stacked tray assemblies 105. The tray 106 may be a corrosion resistant material. The tray 106 includes, but is not limited to, stainless steel, plastic (such as polypropylene), ceramic (such as $Al_2O_3$), brass, or combinations thereof. Although only six of the plurality of optical device lenses 112 are shown in FIG. 1A, any number of the plurality of optical device lenses 112 may be retained by two adjacent tray assemblies 105. Additionally, any number of the plurality of optical device lenses may be retained in the carrier mechanism 100.

The plurality of openings 110 may be laser cut into the tray 106 based on the desired contour of the plurality of openings 110 corresponding to the plurality of optical device lenses 112. The plurality of openings 110 allow for fluids, gases, or solids to contact the plurality of optical device lenses 112. For example, a chemical bath or water batch can contact the plurality of optical device lenses 112 through the plurality of openings 110. The fluids, gases, or solids may also contact the plurality of optical device lenses 112 through a gap 126 between the two stacked tray assemblies 105. The gap 126 is between about 6 mm and about 12 mm. Additionally, the plurality of openings 110 and the gap 126 allows for optical inspection of the plurality of optical device lenses 112.

The plurality of optical device lenses 112 can be any optical device lens used in the art, and can be either opaque or transparent depending on the use of the optical device lens. Additionally, optical device lens selection may further include varying shapes, thickness, and diameters of the plurality of optical device lenses 112. The tray assembly 105 is operable to be adjusted to fit different optical device lens shapes. In one embodiment, which can be combined with other embodiments described herein, the plurality of optical device lenses 112 include, but are not limited to, silicon (Si), silicon dioxide ($SiO_2$), fused silica, quartz, silicon carbide (SiC), germanium (Ge), silicon germanium (SiGe), indium phosphide (InP), gallium arsenide (GaAs), gallium nitride (GaN), sapphire, or combinations thereof. In some embodiments, which can be combined with other embodiments described herein, the plurality of optical device lenses 112 are flat optical devices, such as metasurfaces. In other embodiments, which can be combined with other embodiments described herein, the plurality of optical device lenses 112 are waveguide combiners, such as augmented reality waveguide combiners. In another embodiment, which can be combined with other embodiments described herein, the plurality of optical device lenses 112 can have optical device structures patterned on a first surface 113 or a second surface 115 (shown in FIG. 1B) of the plurality of optical device lenses 112.

Figure 1B:
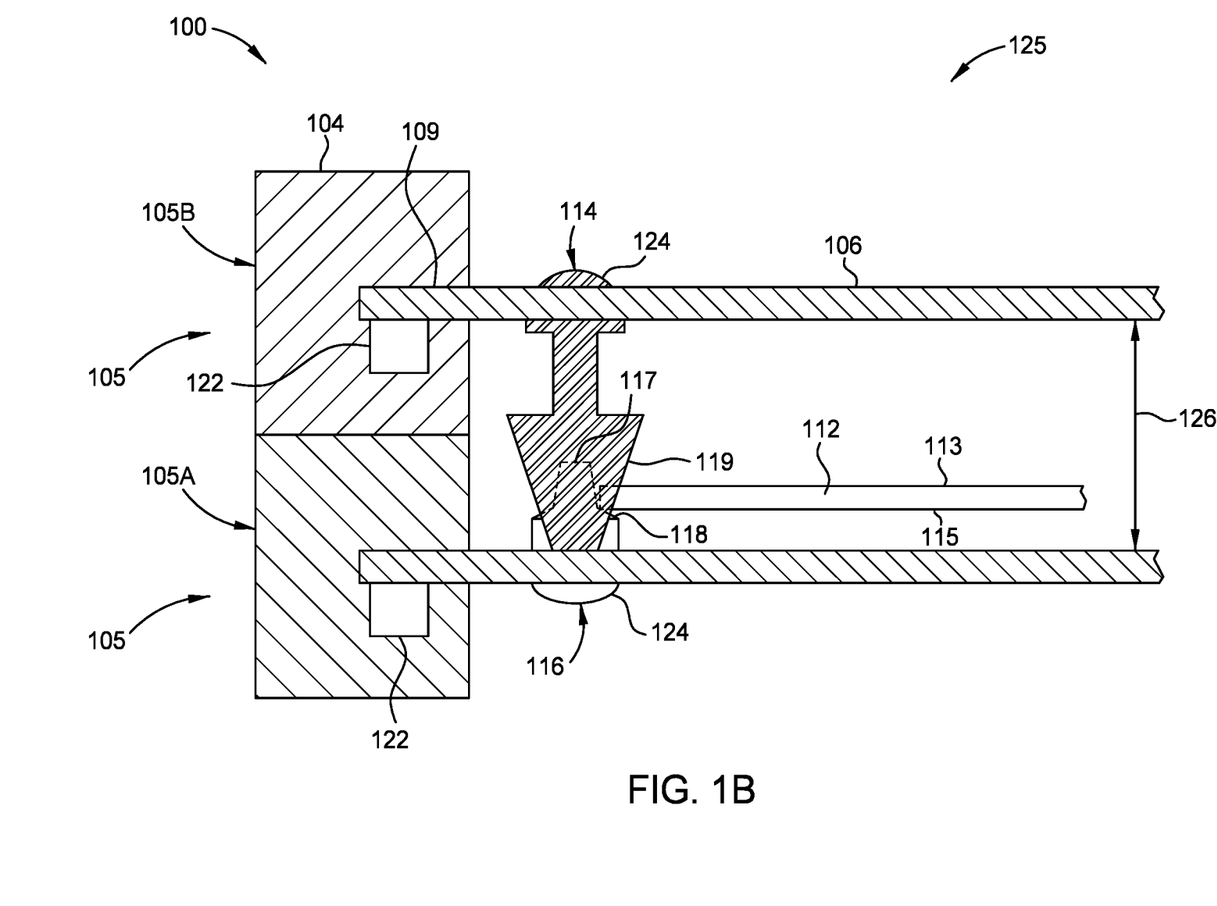
FIG. 1B is a schematic, cross-sectional view of a portion of a carrier mechanism according to embodiments.

FIG. 1B is a schematic, cross-sectional view of a portion 125 of the carrier mechanism 100. The portion 125 is shown in FIG. 1A. As seen in FIG. 1B, the tray 106 is disposed in the second slit 109 of the non-locating rail 104. The tray 106 may be held in place by setscrews 122. The setscrews 122 are disposed in the non-locating rail 104 and may be tightened to contact the tray 106 for improved stability and retention of the tray 106. The setscrews 122 may also be disposed in the locating rail 102 to retain the tray 106 in the first slit 108.

The plurality of capture pins 114 and the plurality of support pins 116 are coupled to the tray 106. The plurality of capture pins 114 and the plurality of support pins 116 are offset to prevent over-constraint of the plurality of optical device lenses 112. An optical device lens of the plurality of optical device lenses 112 is positioned into contact with the support pin 116. The plurality of support pins 116 each include a ramp 118 and a capture post 117. The ramp 118 allows for corners of the plurality of optical device lenses 112 to sit on the plurality of support pins 116. In one embodiment, which can be combined with other embodiments described herein, the ramp 118 is substantially shallow such that the corners of the plurality of optical devices are retained without moving or shifting on the ramp 118. Thus, the plurality of optical device lenses 112 are not contacted on the edges and faces of the plurality of optical device lenses 112. The ramp 118 allows the plurality of optical device lenses 112 to be retained without damaging the plurality of optical device lenses 112. The capture post 117 prevents lateral movement of the plurality of optical device lenses 112. The plurality of capture pins 114 provide a vertical force to retain the plurality of optical device lenses 112 while the plurality of support pins 116 prevent lateral movement of the plurality of optical device lenses 112. The retention of the plurality of optical device lenses 112 in the carrier mechanism 100 by the plurality of capture pins 114 and the plurality of support pins 116 allows for the plurality of optical device lenses 112 to be transferred to multiple processing stations for processing. The carrier mechanism 100 retains the plurality of optical device lenses 112 securely such that additional handling is not required for the plurality of optical device lenses 112. Therefore, the carrier mechanism 100 minimizes damage to the plurality of optical device lenses 112. Additionally, the carrier mechanism 100 providing for multiple processing steps of the plurality of optical device lenses 112 increases throughput as less time is required for handling and transferring the plurality of optical device lenses 112.

A ramp 119 of each of the plurality of capture pins 114 also improves lateral support of the plurality of optical device lenses 112 without damaging the plurality of optical device lenses 112. The retention of the plurality of optical device lenses 112 allows for the carrier mechanism 100 to be utilized for processing methods such as vertical processing. The plurality of support pins 116 and the plurality of capture pins 114 include a plastic material such as polyetheretherketone, polypropylene, or other high temperature plastics.

The plurality of support pins 116 and the plurality of capture pins 114 are coupled to the tray 106 with a heat staking process. The plurality of support pins 116 and the plurality of capture pins 114 include a bonding region 124. The bonding region 124 of each of the plurality of support pins 116 and the plurality of capture pins 114 is disposed through the tray 106. A heat staking process is applied to the bonding region 124 to couple the plurality of support pins 116 and the plurality of capture pins 114 to the tray 106. The heat exposure provides a bonded seal to the tray 106 such that the plurality of support pins 116 and the plurality of capture pins 114 are retained in the tray 106. In one embodiment, which can be combined with other embodiments described herein, the bonding region 124, when exposed to the heat staking process, forms a rivet and is bonded to the tray 106.

Figure 1C:
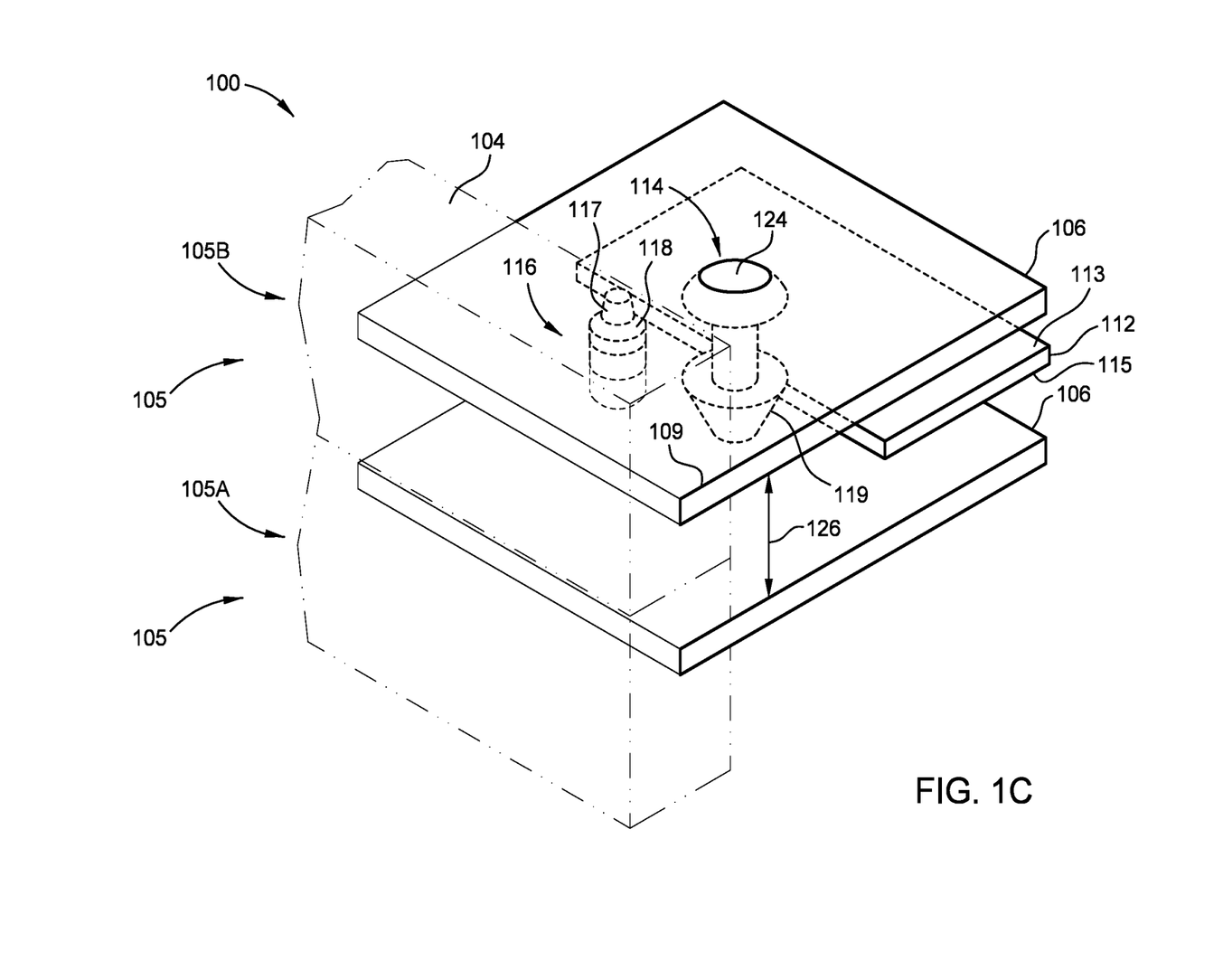
FIG. 1C is a schematic, perspective view of a portion of the carrier mechanism according to embodiments.

FIG. 1C is a schematic, perspective view of a portion 125 of the carrier mechanism 100. The portion 125 is shown in FIG. 1A. As shown in FIG. 1C, the plurality of capture pins 114 and the plurality of support pins 116 are offset to prevent over-constraint of the optical device lens of the plurality of optical device lenses 112. The bonding region 124 of the plurality of support pins 116 and the plurality of capture pins 114 are disposed through the tray 106. The heat staking process forms a rivet with the bonding regions 124 to secure the plurality of capture pins 114 and the plurality of support pins 116 to the tray 106. Further, as seen in FIG. 1C, fluids, i.e., cleaning fluids, may be forced through the plurality of openings 110 or the gap 126 while the plurality of optical device lenses 112 are retained between the trays 106.

Figure 2:
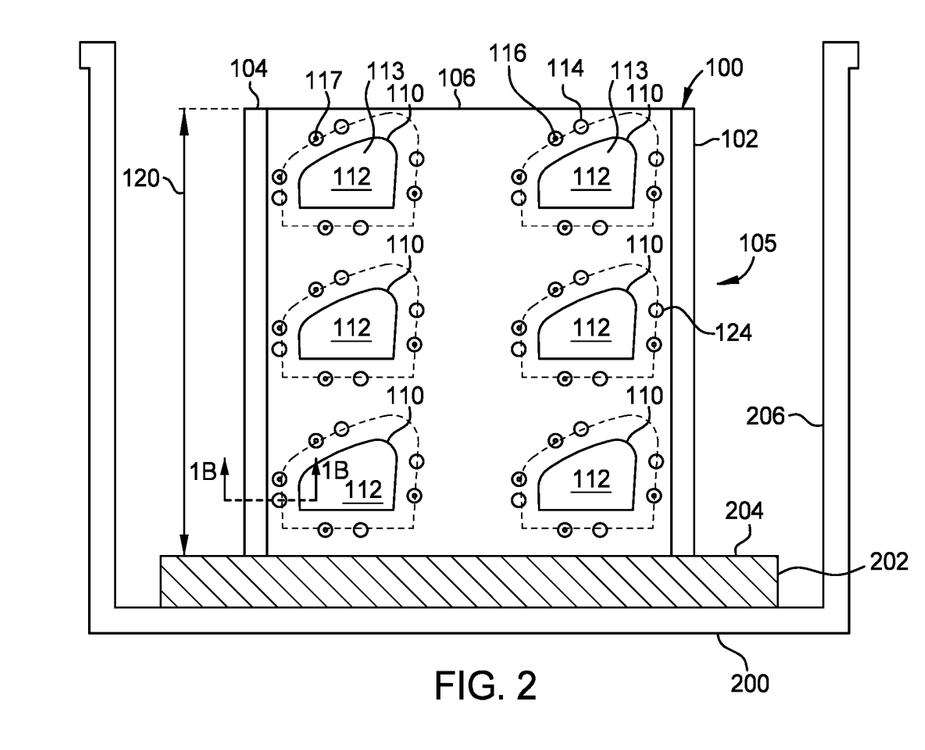
FIG. 2 is a schematic, cross sectional view of a processing station according to embodiments.

FIG. 2 is a schematic, cross sectional view of a processing station 200. The carrier mechanism 100 is disposed in the processing station 200. The processing station 200 can be configured to deliver ultrasonic energy to a plurality of optical device lenses 112 retained by the carrier mechanism 100. The ultrasonic energy is provided by a transducer 202. The processing station 200 allows for soaking of the carrier mechanism 100 in a fluid. In one embodiment, which can be combined with other embodiments described herein, the fluid is a cleaning fluid and the cleaning fluid is forced through a plurality of openings 110 or a gap 126 of the carrier mechanism to remove particles on the plurality of optical device lenses 112. In some cases, the cleaning fluid includes, but is not limited to, hydrogen fluoride (HF), hydrochloric acid (HCl), nitric acid ($HNO_3$), citric acid ($C_6H_8O_7$), ammonium hydroxide ($NH_4OH$), deionized water (DIW), or combinations thereof. In another embodiment, which can be combined with other embodiments described herein, the carrier mechanism 100 can be disposed on a pedestal (not shown) in the processing station 200. In yet another embodiment, which can be combined with other embodiments described herein, the processing station 200 can be configured to deliver air flow to the plurality of optical device lenses 112 retained by the carrier mechanism 100. For example, the air flow may be forced through the plurality of openings 110 or a gap 126 of the carrier mechanism to dry the plurality of optical device lenses 112. The processing station 200 can also be configured to spray gases, fluids, or solids to the plurality of optical device lenses 112 retained by the carrier mechanism 100.

The plurality of optical device lenses are retained in the carrier mechanism 100 by a plurality of capture pins 114 and a plurality of support pins 116 disposed in a tray 106 of a tray assembly 105. The carrier mechanism 100 includes stacks of the tray assemblies 105 allowing for the plurality of optical device lenses 112 to be retained in a vertical processing position. Thus, a first surface 113 or a second surface 115 of the plurality of optical device lenses 112 is perpendicular to a surface 204 of the transducer 202. The first surface 113 and the second surface 115 may have optical device structures disposed thereon. Therefore, the first surface 113 and the second surface 115 are the surfaces to be cleaned. The first surface 113 and the second surface 115 are parallel to the direction the transducer 202 directs ultrasonic energy, such that air pockets will not form. In other embodiments, which can be combined with other embodiments described herein, the transducer 202 is disposed on a sidewall 206 of the processing station 200. Therefore, to ensure the ultrasonic energy is directed parallel to the surfaces to be cleaned of the plurality of optical device lenses 112, the carrier mechanism 100 is positioned with the first surface 113 and the second surface 115 perpendicular to the sidewall 206 of the processing station 200.

Figure 3:
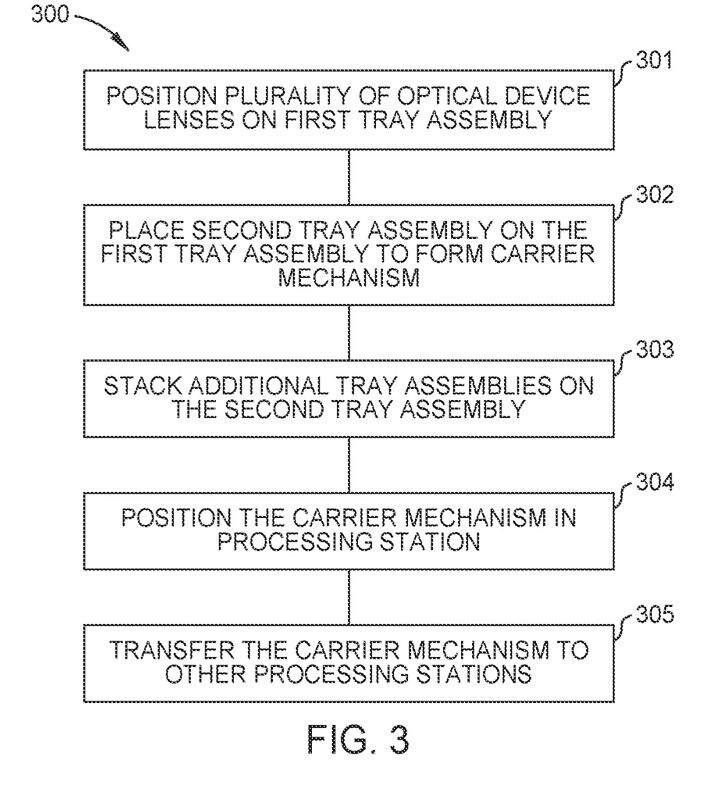
FIG. 3 is a flow diagram of a method for retaining a plurality of optical device lenses in a carrier mechanism according to embodiments.

FIG. 3 is a flow diagram of a method 300 for retaining a plurality of optical device lenses 112 in a carrier mechanism 100. At operation 301, the plurality of optical device lenses 112 are positioned on a first tray assembly 105A. The plurality of optical device lenses 112 are in contact with a plurality of support pins 116 disposed in a tray 106 of the first tray assembly 105A. At operation 302, a second tray assembly 105B is placed over the first tray assembly 105A. A plurality of capture pins 114 disposed in the second tray assembly 105B further retain the plurality of optical device lenses 112. The locating rail 102 and non-locating rail 104 of the first tray assembly 105A are aligned and stacked with the locating rail 102 and non-locating rail 104 of the second tray assembly 105B. The plurality of capture pins 114 retained in the second tray assembly 105B surround the plurality of optical device lenses 112 disposed in the carrier mechanism 100.

At optional operation 303, additional tray assemblies 105 are stacked on the second tray assembly 105B until a desired number of the plurality of optical device lenses 112 have been retained in the carrier mechanism 100.

Figure 4:
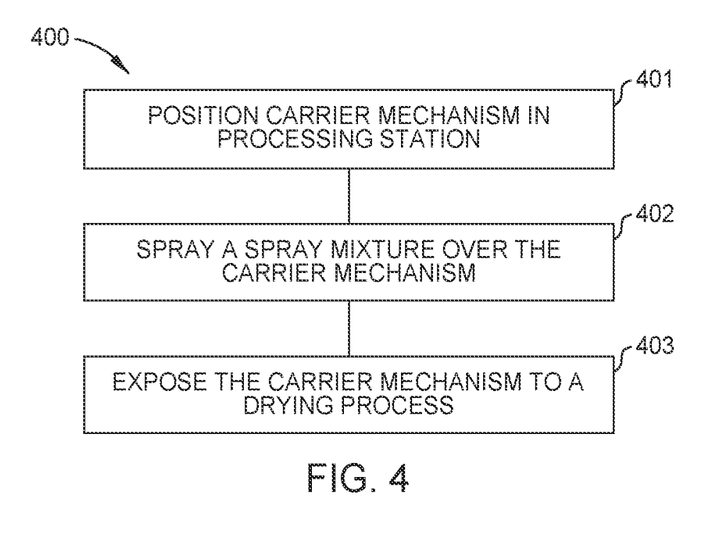
FIG. 4 is a flow diagram of a sub-method for processing a plurality of optical device lenses in a carrier mechanism according to embodiments.

At optional operation 304, a sub-method 400 is performed. FIG. 4 is a flow diagram of a sub-method 400 for processing a plurality of optical device lenses 112 in a carrier mechanism 100. The sub-method 400 is described with reference to the processing station 200 of FIG. 2. However, the sub-method 400 may be performed in conjunction with other processing stations in accordance with the embodiments of the disclosure described herein. At operation 401, the carrier mechanism 100 is positioned in a processing station 200. The carrier mechanism 100 is positioned such that a first surface 113 and a second surface 115 of the plurality of optical device lenses 112 are parallel to the direction of propagation of the ultrasonic energy. The ultrasonic energy is provided by a transducer 202. The ultrasonic energy forces fluid through a gap 126 and a plurality of openings 110 in the carrier mechanism 100 such that the fluid contacts the plurality of optical device lenses 112. In one embodiment, the ultrasonic energy has a frequency of about 20 kHz to about 100 MHz. In another embodiment, which can be combined with other embodiments described herein, megasonic energy may be utilized in the operation 304.

At operation 402, a spray mixture is sprayed over the carrier mechanism 100. The spray mixture is sprayed through the gap 126 and the plurality of openings 110 in the carrier mechanism 100 such that the spray mixture contacts the plurality of optical device lenses 112. The spray mixture includes, but is not limited to, one or more of a gaseous $CO_2$, liquid $CO_2$, solid $CO_2$, combinations thereof, or other suitable materials.

At operation 403, the carrier mechanism 100 is exposed to a drying process. The drying process includes flowing air through the gap 126 between the first tray assembly 105A and the second tray assembly 105B and through the plurality of openings 110. For example, the drying process may include directing air at the plurality of optical device lenses 112 to dry the plurality of optical device lenses 112 after prior processing steps such as the operation 402. In some embodiments, which can be combined with other embodiments described herein, the drying process is performed in the processing station 200 of the operation 402. In other embodiments, which can be combined with other embodiments described herein, the drying process performed in a separate processing station.

In another optional operation 305, the carrier mechanism 100 may be transferred to other processing stations for additional processing steps. The carrier mechanism 100 provides for multiple processing steps to be performed on the plurality of optical device lenses 112 while retained in the carrier mechanism 100. Therefore, the carrier mechanism 100 minimizes damage to the plurality of optical device lenses 112 as there is less handling of the plurality of optical device lenses 112 between processing steps. Additionally, the carrier mechanism 100 providing for multiple processing steps of the plurality of optical device lenses 112 increases throughput as less time is required for handling and transferring the plurality of optical device lenses 112.

In summation, a carrier mechanism for retaining optical devices is shown and described herein. The carrier mechanism includes adjacent tray assemblies stacked such that a plurality of optical device lenses are retained therebetween. The tray assembly includes a locating rail, a non-locating rail, and a tray retained by the locating rail and the non-locating rail. The tray includes a plurality of capture pins and a plurality of support pins disposed therethrough. The plurality of capture pins and plurality of support pins retain the plurality of optical device lenses without contacting or damaging the plurality of optical device lenses by contacting corners of the optical device lenses. Each tray includes a plurality of openings corresponding to the plurality of optical device lenses such that fluids may contact the plurality of optical device lenses. Additionally, the plurality of openings provide for optical inspection of the plurality of optical device lenses. The carrier mechanism is operable to be utilized in multiple processing methods and therefore minimizes damage to the plurality of optical device lenses and increases throughput.

While the foregoing is directed to examples of the present disclosure, other and further examples of the disclosure may be devised without departing from the basic scope thereof, and the scope thereof is determined by the claims that follow.

What is claimed is:

1. A carrier having at least two tray assemblies, each tray assembly comprising:
    a first locating rail;
    a first non-locating rail;
    a tray coupled to the first locating rail and the first non-locating rail, the tray disposed between the first locating rail and the first non-locating rail;
    a plurality of openings and a plurality of capture pins disposed through the tray; and
    a plurality of support pins disposed through the tray, the plurality of support pins and the plurality of capture pins operable to retain a plurality of optical device lenses.

2. The carrier of claim 1, wherein the first locating rail of a first tray assembly is in contact with a second locating rail of a second tray assembly; the first non-locating rail of the first tray assembly is in contact with a second non-locating rail of the second tray assembly, and the first tray assembly and the second tray assembly are adjacent to each other.

3. The carrier of claim 2, wherein a gap between the first ay assembly and the second tray assembly is between about 6 mm and about 12 mm.

4. The carrier of claim 1, wherein the tray is retained in a first slit of the first locating rail and a second slit of the first non-locating rail.

5. The carrier of claim 4, wherein a plurality of setscrews are disposed in the first locating rail and the first non-locating rail to couple the tray to the first slit and to the second slit.

6. The carrier of claim 1, wherein the plurality of capture pins include a ramp operable to provide lateral support to the plurality of optical device lenses.

7. The carrier of claim 1, wherein the plurality of support pins include a ramp and a capture post.

8. The carrier of claim 1, wherein the tray includes a material that comprises stainless steel, plastic, ceramic, brass, or combinations thereof.

9. A carrier having at least two tray assemblies, each tray assembly comprising:
   a first locating rail;
   a first non-locating rail;
   a tray coupled to the first locating rail and the first non-locating rail, the tray disposed between the first locating rail and the first non-locating rail;
   a plurality of openings and a plurality of capture pins disposed through the tray; and
   a plurality of support pins disposed through the tray, the plurality of support pins and the plurality of capture pins operable to retain a plurality of optical device lenses, the plurality of support pins including a ramp operable to contact a corner of the plurality of optical device lenses.

10. The carrier of claim 9, wherein the first locating rail of a first tray assembly is coupled to a second locating rail of a second tray assembly, the first non-locating rail of the first tray assembly is coupled to a second non-locating rail of the second tray assembly, the first tray assembly and the second tray assembly adjacent to each other.

11. The carrier of claim 10, wherein a gap between the first tray assembly and the second tray assembly is between about 6 mm and about 12 mm.

12. The carrier of claim 9, wherein the plurality of capture pins include a ramp operable to provide lateral support to the plurality of optical device lenses.

13. The carrier of claim 9, wherein the plurality of support pins and the plurality of capture pins include a plastic material.

14. The carrier of claim 9, wherein the tray includes a material that comprises stainless steel, plastic, ceramic, brass, or combinations thereof.

15. A carrier having at least two tray assemblies, each tray assembly comprising:
   a first locating rail;
   a first non-locating rail;
   a tray coupled to the first locating rail and the first non-locating rail, the tray disposed between the first locating rail and the first non-locating rail;
   a plurality of openings disposed through the tray operable to provide access to a plurality of optical device lenses;
   a plurality of capture pins disposed through the tray, the plurality of capture pins each comprise:
     a first ramp;
   a plurality of support pins disposed through the tray, the plurality of support pins each comprise;
     a second ramp; and
     a capture post extending from the second ramp, the plurality of support pins and the plurality of capture pins operable to retain the plurality of optical device lenses.

16. The carrier of claim 15, wherein the plurality of capture pins and the plurality of support pins are offset.

17. The carrier of claim 15, wherein the plurality of capture pins provide a vertical force to retain the plurality of optical device lenses and the plurality of support pins prevent lateral movement of the plurality of optical device lenses.

18. The carrier of claim 15, wherein the first locating rail of a first tray assembly is coupled to a second locating rail of a second tray assembly, the first non-locating rail of the first tray assembly is coupled to a second non-locating rail of the second tray assembly, the first tray assembly and the second tray assembly adjacent to each other.

19. The carrier of claim 15, wherein the plurality of support pins and the plurality of capture pins include a plastic material.

20. The carrier of claim 19, wherein the tray includes a material that comprises stainless steel, plastic, ceramic, brass, or combinations thereof.

* * * * *